Sept. 4, 1945.   C. LE BLEU   2,384,318
SELECTOR, CONTROL VALVE AND THE LIKE
Filed Oct. 28, 1942   2 Sheets-Sheet 1

INVENTOR.
BY Charles Le Bleu

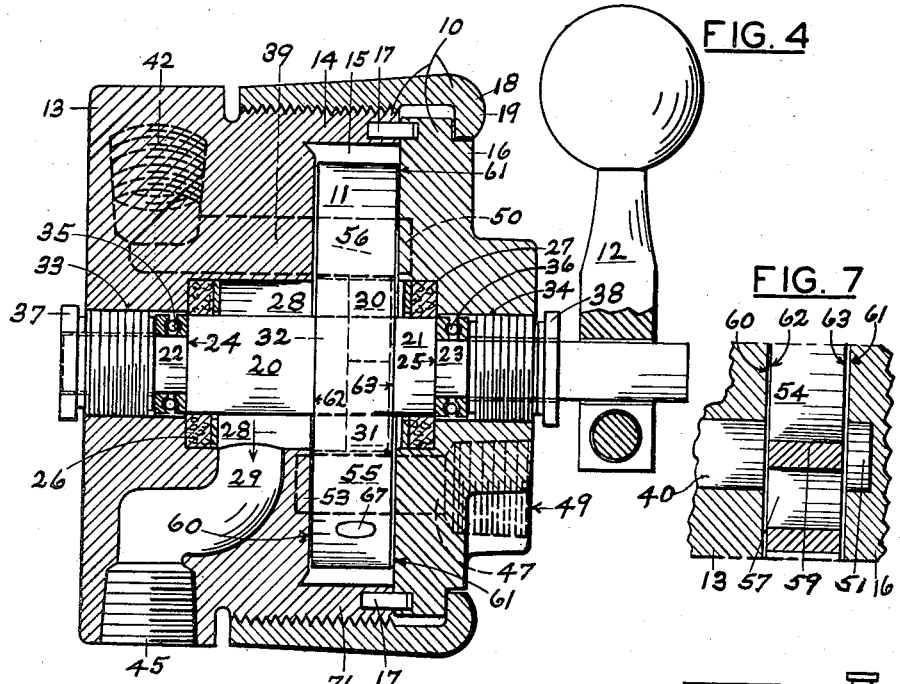
FIG. 4
FIG. 7
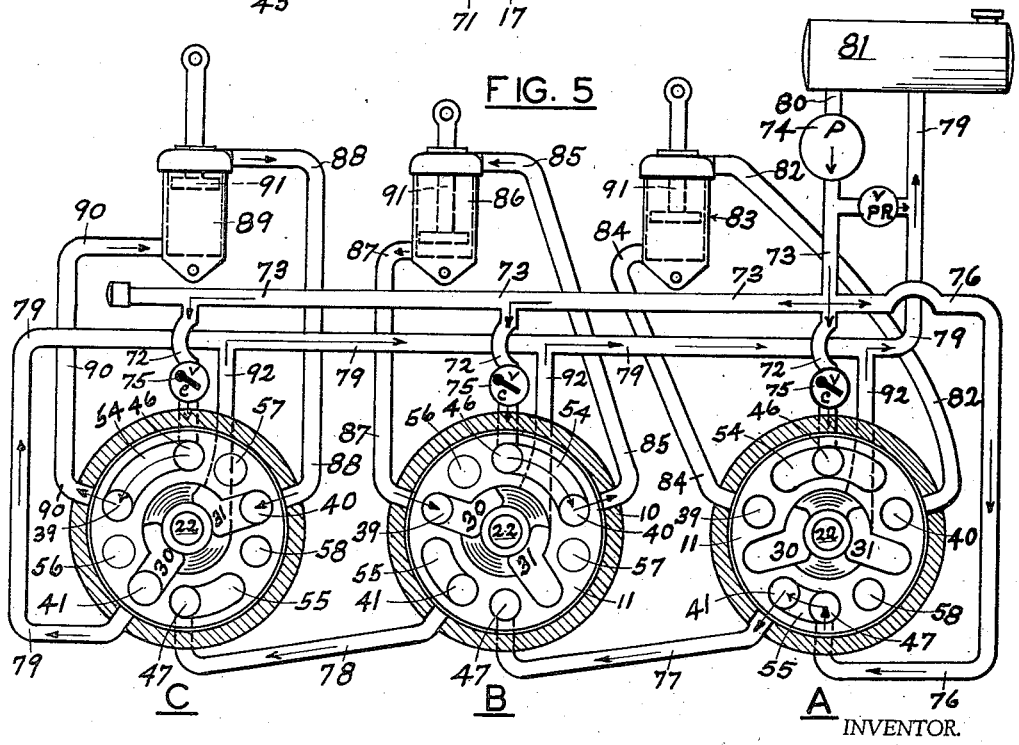
FIG. 5
INVENTOR.
BY Charles Le Bleu

Patented Sept. 4, 1945

2,384,318

UNITED STATES PATENT OFFICE 2,384,318

SELECTOR, CONTROL VALVE, AND THE LIKE

Charles Le Bleu, Los Angeles, Calif.

Application October 28, 1942, Serial No. 463,583

11 Claims. (Cl. 251—85)

My invention relates to valves adapted to be used to selectively permit, restrict, or interrupt the flow of liquid through conduit means with which the valve is associated. More specifically, my invention relates to valves which are commonly known as selector valves, control valves and so forth, used to selectively control the flow of fluids under pressure to and from hydraulically operated actuating units, such as hydraulic jacks, motors, rams, etc., and my invention should be especially useful in the airplane industry for controlling the flow of fluid under high pressure to and from various hydraulic operating units which are operable to actuate retractable landing gear, tail wheels, cowl flaps, wing flaps, etc.

In the airplane industry, and in many others, it is often desirable that the hydraulic mechanism be designed to be actuated by fluid under extremely high pressure to economize on installation space, and weight of hydraulic equipment. The extent to which operating pressures may be increased has been limited to a considerable extent by the effect of high pressures on the selector valves, that is, pressures can be increased to the point where it becomes extremely difficult, if not impossible, to operate the valves when subjected to said high pressures because of the unequalized or unbalanced effect of said pressures on the valve plug and the resulting frictional contact between the valve plug and the adjacent valve body, that is to say between the relatively movable and stationary elements caused by said pressures.

It is, therefore, an object of this invention to provide a valve in which the fluid under pressure applied to the valve will not cause excessive frictional contact as between the valve plug and the valve body, that is to say, between the relatively movable and stationary cooperating elements of the valve, extremely high pressures notwithstanding.

Still another object of my invention is the provision of a device of the class described including the combination of structure, design and arrangement which will prevent the fluid under pressure within the valve from causing excessive frictional contact as between the relatively movable and stationary cooperating elements of the valve.

It is often desirable to direct fluid under pressure to a plurality of hydraulically operated actuating units simultaneously from a common source of fluid pressure or, selectively, to direct said fluid to only one of said units. This is often accomplished by the use of an accumulator in which fluid is stored under air pressure, and a four way valve for each actuating unit is connected therewith and direct to said accumulator. There will be a number of advantages accruing from the elimination of this accumulator from the hydraulic system.

Therefore, yet another object of my invention is the provision in a valve of the character described, of means whereby a plurality of said valves may be connected, both in series and in common, with a single source of fluid pressure, such as a pressure pump, or pumps, so as to bypass said fluid only when all of said valves are in a neutral position, and whereby each of said valves is connected with said source of fluid pressure when one or more of said valves is in an operating position, so that fluid under pressure will be available at each of said valves in operating position of one or more of said valves for the simultaneous operation of a plurality of actuating units from said single source of fluid pressure or, selectively, for the operation of only one of said units.

Still another object of my invention is the provision in a valve; a valve body having ports formed therein; a valve plug mounted in said body and having certain passages arranged to cooperate with certain of said ports to permit the flow of fluid through said valve only in an operative position of said plug, and yet another passage through said plug arranged to cooperate with still others of said ports to permit the flow of fluid through the valve only in a neutral position of said plug so that a plurality of said valves may be connected both in series and in common with a common source of fluid pressure so as to bypass said fluid only when all of said valves are in the neutral position, and whereby all of said valves are subjected to fluid under pressure when one or more of them is in an operative position.

A further object of my invention is to provide a simple and inexpensive device and yet one which will be exceedingly effective for the purpose for which it is designed.

These and other desirable objects will become apparent to those skilled in the art upon a detailed perusal of the accompanying drawings and the following specifications.

In the drawings

Figure 4 is a cross section of the valve, the plane of which is indicated by lines 4—4 of Figure 1.

Figure 5 is a diagramatic illustration of a simple hydraulic system which includes the selector valve of my invention and illustrates its use in controlling a plurality of hydraulically operated actuating units from a common source of fluid pressure. This illustration shows the conduit arrangement by which the valves are connected, both in series and in common, with a common source of fluid pressure.

Figure 1:
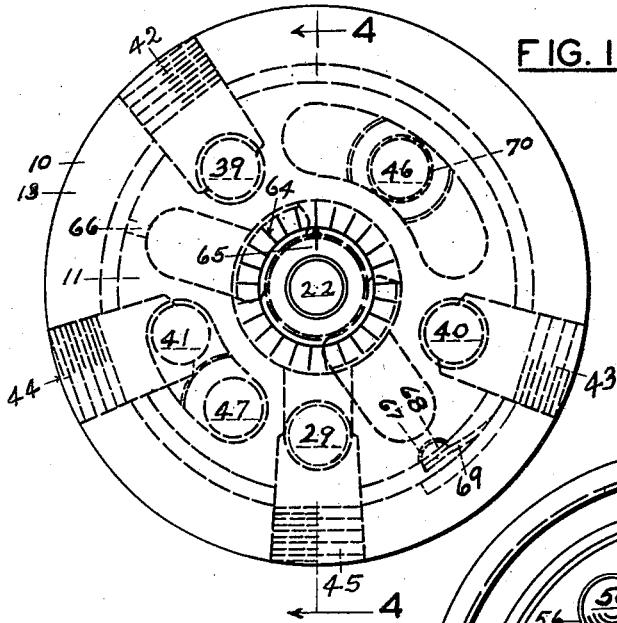
Figure 1 is a view of that end of the valve which is provided with the ports from which fluid is discharged from the valve, the valve being in neutral position.
Figure 6:
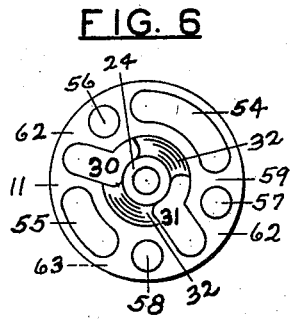
Figure 2:
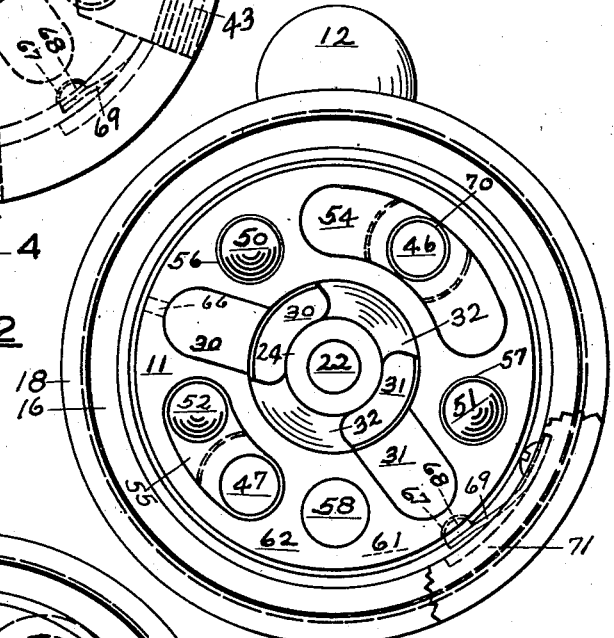
Figure 2 is a view from that end of the valve from which fluid is discharged, as in Figure 1, but with the end member which carries the discharge ports removed, except for a fragment thereof which carries the valve plug indexing means, so as to more clearly show the construction, and the valve plug disposed in the neutral position.

Figure 6 is an end view of a reduced scale reproduction of the plug shown in Figures 1, 2 and 4.

Figure 7 is a fragmentary view in section through one of the ports and its cooperating pressure cavity, the valve plug being in an intermediate position to show communication between the ports and their cavities during movement of the plug from one registered position to another.

Reference is now made to the drawings in which the valve includes a body 10, a valve plug 11 movably mounted therein with suitable operating tolerances, and an operating lever which is applied to said valve plug for appropriately moving the same.

The body 10 includes an exhaust head 13 having a male threaded portion 14, and a recess 15 formed therein and in which the valve plug 11 is disposed. An intake head 16 is disposed to cover the recess 15, as shown, so that the valve plug 11 is suitably enclosed between the confronting fluid control and restricting surfaces of heads 13 and 16, exhaust and intake heads 13 and 16 being secured in position by dowel pins 17 and a shoulder coupling 18 which is internally threaded to receive threaded portion 14, the shoulder 19 of the coupling being seated, as shown, on the intake head 16, thus securing said head in place.

Valve plug 11 is provided with laterally projecting members 20 and 21 each of which has formed on its outer end a trunnion, 22 and 23, of smaller cross section than members 20 and 21, thus providing shoulders 24 and 25.

Exhaust and intake heads 13 and 16 are each formed to receive respectively packing glands 26 and 27, packing gland 26 being substantially removed from the adjacent face of valve plug 11 so as to provide a fluid passage 28 which communicates with conduit 29 and fluid passages 30, 31 and 32 formed in plug 11. Passage 32 serves as intercommunication between passages 30 and 31.

Each of the heads 13 and 16 is provided with a threaded opening 33 and 34, through which the trunnions 22 and 23, respectively, extend. Each trunnion is provided respectively with a thrust bearing 35 and 36 which seat on the shoulders 24 and 25, and threaded openings 33 and 34 are provided respectively with male threaded bushings, 37 and 38, which seat respectively on bearings 35 and 36, and through which trunnions 22 and 23 extend.

The valve plug 11 is thus rotatably mounted within the body 10, and may be selectively adjusted along its axis of rotation to a position substantially midway between the confronting fluid control and restricting surfaces of heads 13 and 16 by suitable adjustment of threaded bushings 37 and 38, after which it may be positively retained in this adjusted position to provide substantially equal operating tolerance at opposite sides of plug 11. An operating lever 12 is applied to the projecting end of trunnion 23.

Exhaust head 13 is provided with ports 39, 40, and 41, see Figures 1 and 4, which communicate respectively with conduit connections 42, 43, and 44. The exhaust head 13 is also provided with conduit connection 45 which communicates with the internal conduit 29, see Figure 4.

Figure 3:
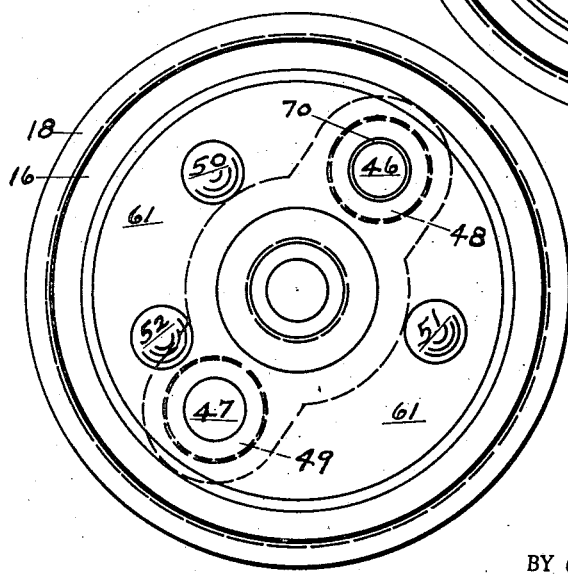
Figure 3 is a view from that end of the valve from which fluid is discharged, as in Figures 1 and 2, but with the end member which carries the discharge ports together with the valve plug removed so as to show the two ports through which fluid enters the valve.

Intake head 16 is provided with ports 46 and 47 which communicate respectively with conduit connections 48 and 49, see Figures 3 and 4. Head 16 is also provided with pressure cavities 50, 51, and 52, see Figures 2, 3 and 4, formed therein and arranged respectively opposite ports 39, 40 and 41 of the exhaust head and substantially in alignment therewith.

A pressure cavity 53, see Figure 4, is formed in the exhaust head 13 opposite port 47 of the intake head and substantially in alignment therewith.

Pressure cavities 50, 51, 52 and 53 are similar, and the area of each of them is substantially equal to the area of the port opposite which it is located.

It is believed that a better understanding of the arrangement of the fluid passages in the valve plug 11 will be acquired by viewing Figures 2, 4 and 6 and the reference numerals used in a description of these fluid passages do not appear on Figure 1. Viewing particularly Figures 2, 4 and 6, the plug 11 is provided with elongated openings 54, 55, 30 and 31, and with circular openings 56, 57 and 58. The plug 11 being in neutral position; that is, the position of Figures 2, 4 and 6, the elongated passage 55 serves to establish communication between ports 41 and 47 and their respective pressure cavities 52, Figure 2, and 53, Figure 4. Passage 56 connects port 39 with cavity 50. Passage 57 connects port 40 with pressure cavity 51. Elongated openings 30 and 31 communicate at all times with each other through passages 32 and with passage 28; and the elongated passage 54 is always in communication with the pressure port 46; while passage 58 is not in communication with any ports or pressure cavities in this neutral position.

It should be noted at this time that the walls or partitions 59 separating fluid passages in the plug 11, see Figure 7, are of less width than the diameter of the ports and pressure cavities with which they cooperate so that as the plug 11 is moved from one position to another the ports and their respective pressure cavities are always in communication. Thus, the ports and their respective pressure cavities are in communication in any position of valve plug 11.

It should also be noted at this time that the ports and cavities are deliberately smaller in diameter than their cooperating passages in the valve plug 11 so that only ordinary manufacturing tolerances need be applied in the relative arrangement of ports, pressure cavities and fluid passages. If some such provision were not provided the objects of my invention could nevertheless be attained but with greater difficulties from a manufacturing view point because if ports, pressure cavities, and passages in the plug were of equal diameter, then the relative arrangement and alignment of these features would have to closely approach perfection to prevent extremely high pressures from applying unequalized and unbalanced forces as between the movable plug and the relatively stationary body.

Structure and arrangement for attaining the objects of the invention have now been described and it is perhaps desirable at this time that the functioning of this structure and arrangement in attaining the objects of the invention be described.

To attain one of the objects of my invention, namely, the provision of a valve in which the fluid under pressure applied to the valve will not cause excessive frictional contact as between the relatively movable and stationary elements of the valve, I have provided, in the present preferred form of my invention, a valve in which the fluid control and restricting surfaces of the valve body and plug are in planes extending across the axis of rotation of the plug. These are indicated at 60, 61, 62 and 63, see Figures 2, 3, 4 6 and 7, especially the latter. To provide a valve that may be operated with little physical force applied to the operating lever 12, even under extremely high fluid pressures, the following provisions must be made: port pressure, which is the product of the area of the port and the fluid pressure, should not be applied direct to only one of the restricting surfaces of the plug as is usually done, for this would force the opposite face of the plug into frictional contact with the adjacent cooperating surface of the relatively stationary body. I have therefore provided pressure cavities in the body opposite each of the pressure ports and I have established communication between ports and cavities by providing fluid passages through the plug, and since this feature is common to all pressure ports and cavities only two will be described in detail. Referring to Figure 4, port 39, in the exhaust head 13, is in communication with pressure cavity 50 in the intake head 16 through the fluid passage 56 in the plug 11. Again, port 47 in the intake head 16 is in communication with the fluid passage 55 in the plug 11 which in turn communicates with pressure cavity 53 in the exhaust head 13. Thus, it is readily seen that fluid pressure in either one or both of the ports 39 and 47 would have no direct tendency to force the valve plug 11 into frictional contact with either of the cooperating faces or surfaces 60 and 61 of the valve body 10, because the fluid under pressure passes from a port in the valve body through the plug and is applied to the body on the opposite side of the plug, thus equalizing port pressure at opposite sides thereof. Now the above description applies in any of the indexed positions of plug 11, but in use, the plug must be rotated from one position to another. Means must therefore be provided whereby the ports and their respective cavities will be in communication during rotation of the plug from one position to another, to also equalize port pressure at intermediate positions, that is to say, in any position of the plug. Means to accomplish this comprises an arrangement of the passages through plug 11 which provides a wall or partition between them that is of less width than the diameter of the passages, with which they cooperate, which is perhaps best illustrated in Figure 7, wherein the valve plug has been rotated to an intermediate position so that the wall or partition 59 is substantially in line with the port 40 and its pressure cavity 51. Thus it is readily seen from viewing Figure 7 that the pressure ports and their respective pressure cavities will be in communication in any position of valve plug 11. There remains one other factor which should be provided for. It is obvious that if valve plug 11 is to rotate freely, the overall dimension from one restricting surface or face to the other of plug 11 must be less than the dimension between the restricting faces or surfaces of the body 10 between which the plug operates. This causes a condition which I shall refer to as pressure seepage or creeping pressure, which is simply the pressure fluid which is forced in between the restricting faces of the plug and the body with the results that it will, at high pressures, be difficult to operate the plug after it has been subjected to high pressure fluid for a short time. This condition prevails because the pressure fluid does not build up equally between opposite operating or restricting surfaces of the valve but, instead, the plug shifts to one side due either to the position of the valve, by gravity, or a force applied to the operating handle, or both, after which pressure fluid creeps in between the opposite cooperating faces and builds up a pressure that causes the plug to "stick" or "bind" from excessive frictional contact between the one side of the plug and its adjacent cooperating surface of the body. Now it should be clear that if the plug is positively maintained in a position of substantially equal operating tolerance between its opposite sides or surfaces and the adjacent restricting surfaces of the body, port pressure having been neutralized, pressure seepage will have substantially no unbalanced influence on the plug because seepage will be equal at opposite sides of the plug. Therefore, as hereinbefore set forth, I have provided thrust bearings 35 and 36, and threaded bushings 37 and 38. These bushings, and the valve heads into which they screw, are threaded forty threads to the inch and both the exhaust and intake heads, 13 and 16, are provided with twenty five substantially equally spaced marks indicated at 64, Figure 1, and each of the bushings 37 and 38 are provided with a pointer 65, see Figure 1. These bushings carrying the pointer 65 may be used in conjunction with marks 64, to determine the total operating tolerance between the plug and body after assembly, and by proper manipulation of bushings 37 and 38 the plug 11 can be positioned very accurately so that there will be substantially equal operating tolerance at opposite sides of the plug. The bushings 37 and 38 which bear on the bearings 35 and 36 respectively should be tight enough, when finally in place, to preload to some extent, bearings 35 and 36 on their seats, that is to say, shoulders 24 and 25. The reason for loading bearings 35 and 36 lies in the fact that the operating tolerances between the plug and the body is very small so that if bearings 35 and 36 were allowed on operating tolerance, this tolerance might, under different operating conditions, exceed the operating tolerances between the plug and the body and the advantages which will accrue from a preloaded operating condition for these bearings might not be realized. Thus the plug is positively maintained in a position in which the operating tolerance at opposite sides thereof is substantially equal, and consequently, the creeping fluid pressures will be substantially equal at opposite sides of the plug. Perhaps it should be pointed out that the bushings 37 and 38 together with the associated marks and pointers are in fact micrometer adjusters.

In Figure 2 is shown an opening 66 which serves to connect the area about the circumference of plug 11 with the return passage 30, thus preventing the accumulation of fluid under pressure in this area.

In Figures 1 and 2, is shown a seat 67 formed in plug 11 in which a detent 68 is seated, detent 68 being attached to a leaf spring 69 which is attached, as shown in Figure 2, to the skirt portion 71 of exhaust head 13. This detent serves to releasably index plug 11 in neutral position and readily releases upon a force being applied to lever 12. The operating limits of plug 11 in opposite directions from the neutral position are determined by a bushing 70 secured in intake port 46 and which projects a short distance into fluid passage 54 of plug 11.

In use, one or more of the valves of my invention may be used in the same hydraulic system as illustrated in Figure 5, in which the ports 46 of the valves A, B, and C are each connected by a conduit 72 with the conduit 73 which in turn is connected to the discharge side of a positive pressure pump 74, each of the conduits 72 including a check valve 75 which opens only to flow toward port 46, the intake side of pump 74 being connected by a conduit 80 with the fluid supply tank 81. Thus, the valves A, B, and C are connected in common with pressure pump 74.

A branch conduit 76 is connected with conduit 73 and with port 47 of the valve A; a conduit 77 connects port 41 of valve A with port 47 of valve B; a conduit 78 connects port 41 of valve B with port 47 of valve C; and a conduit 79 connects port 41 of valve C with the supply tank 81. If the valve plugs 11 of each of the valves B and C are now operated to place them in the neutral position as is the plug 11 of valve A, then ports 41 and 47 of each of the valves B and C will be in communication through passage 55 of each valve, as are the ports 41 and 47 of valve A. Thus, when the valve plugs 11 are all in the neutral position shown in valve A, then the valves A, B, and C are connected in series with a common source of fluid pressure, the pump 74.

I have, therefore, provided a valve which includes means whereby a plurality of said valves are connected, both in series and in common, with the same source of fluid pressure when in neutral position, see Figure 5.

Port 40 of valve A is connected, by a conduit 82, with the rod end of a hydraulic cylinder 83, port 39 being connected, by a conduit 84, to the closed end of said cylinder.

Port 40 of valve B is connected, by a conduit 85, to the rod end of a hydraulic cylinder 46, port 39 of valve B being connected, by a conduit 87, to the closed end of said cylinder.

Conduit 40 of valve C is connected, by a conduit 88, to the rod end of a hydraulic cylinder 89, port 39 of valve C being connected by a conduit 90 to the closed end of cylinder 89.

Cylinders 83, 86 and 89 are each provided with a piston and piston rod assembly 91 in a suitable conventional manner.

Passages 30 and 31 of each of the valves are in communication at all times with internal conduit 29, see Figure 4, and the internal conduit 29 of each of the valves is connected, by a conduit 92, with the return conduit 79, see Figure 5.

Viewing valve A, which is in the neutral or holding position, it will be seen that none of the passages 54, 30 and 31 is in communication with either of the cylinder ports 39 and 40 so that piston 91 is fluid locked in the position shown. But in this position of plug 11 the passage 55 establishes communication between ports 41 and 47. The valve is open for the flow of fluid from the pump 74 into conduit 77. It will be understood that in this position of plug 11 the fluid in passage 54, port 46, and conduit 72 is static.

Viewing valve B, plug 11 has been rotated in a clockwise direction, thus providing communication between ports 40 and 46. At the same time passage 30 is in register with port 39, and there is no communication, when valve plug 11 is in this position, between ports 41 and 47. Consequently, the free flow of fluid from the pump to the valves to the tank, through ports 41, 47 and passage 55, is shut off and there is fluid under pressure in passage 54 of each valve. Fluid under pressure now flows through port 40 and conduit 85 into the rod end of cylinder 86, and as piston 91 moves toward the closed end of the cylinder, fluid flows through conduit 87, port 39, passage 30, hence through passage 28 into internal conduit 29, see Figure 4, and hence through conduits 92 and 79 to the supply tank 81, see Figure 5.

Now viewing C, plug 11 has been rotated in a counterclockwise direction, thus providing communication between ports 46 and 39. At the same time, passage 31 is in register with port 40, and there is again no communication, when the valve plug 11 is in this position, between ports 41 and 47. Consequently the free flow of fluid through these ports by way of passage 55 is not possible and there is fluid under pressure in passage 54 of each of the valves. Fluid under pressure now flows through port 39 and conduit 90 into the closed end of cylinder 89, and as piston 91 moves toward the rod end of the cylinder 89, fluid flows through conduit 88, port 40, passages 31, then through passage 28 into internal conduit 29, from whence it flows through conduits 92 and 79 respectively into the supply tank 81.

While I have shown and described the preferred form my invention, it is now known to me that various changes might be made in the combination, construction and arrangement of parts; members and features, by those skilled in the art without departing from the spirit of the invention as claimed.

Having described my invention, what I claim as new and useful and desire to secure by Letters Patent is:

1. In a valve; a valve body provided with spaced apart confronting fluid control and restricting surfaces having fluid inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operating position, said valve plug being provided with fluid passages therethrough arranged and adapted to cooperate with said ports to restrict and control the flow of fluid through the valve in a manner determined by the position of said valve plug; and means adapted to provide hydraulic connection between each of said ports and its cooperating pressure cavity in any position of said valve plug so as to equalize port pressure at opposite sides of said plug.

2. In a valve; a valve body provided with spaced apart confronting fluid control and restricting surfaces having fluid inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces and having suitable operating tolerance therebetween so as to operably cooperate therewith, said valve plug having neutral and operative positions and provided with fluid control passages therethrough arranged to cooperate with said ports to restrict and control the flow of fluid through the valve in a manner determined by the position of said valve plug; means adapted to provide hydraulic connection between each of said ports and its cooperating pressure cavity in any position of said valve plug so as to equalize port pressure at opposite sides of said plug; and means between said body and said valve plug at opposite sides of said plug to positively maintain said plug in a position providing substantially equal operating tolerance between the opposite sides of said valve plug and the adjacent control and restricting surfaces of the body.

3. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operating positions, said valve plug being provided with fluid passages therethrough arranged and adapted to cooperate with said ports to restrict and control the flow of fluid through the valve in a manner determined by the position of said valve plug; and means adapted to provide hydraulic connection between each of said ports and its cooperating pressure cavity in neutral position of said valve plug so as to equalize port pressure at opposite sides of said plug.

4. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite cavity being substantially of equal area; a valve plug rotatably mounted in said body between said fluid control and restricting surfaces so as to cooperate therewith and having neutral and operating positions, said valve plug being provided with fluid passages therethrough arranged and adapted to cooperate with said ports to restrict and control the flow of fluid through the valve in a manner determined by the position of said valve plug; and means providing hydraulic connection between each of said ports and its cooperating cavity in the neutral position of said valve plug and also during rotation of said valve plug from one of its positions to another so as to equalize port pressure at opposite sides of said plug.

5. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operating positions, said valve plug being provided with fluid passages therethrough arranged and adapted to cooperate with said ports to restrict and control the flow of fluid through the valve in a manner determined by the position of said valve plug; means providing hydraulic connection between each of said ports and its cooperating pressure cavity in neutral position of said valve plug so as to equalize port pressure at opposite sides of said plug; and other means whereby said hydraulic connection between each of said ports and its cooperating pressure cavity will be maintained during rotation of said valve plug from one of its positions to another.

6. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operative positions, said valve plug being provided with fluid control passages therethrough arranged and adapted to cooperate with said ports to restrict and control the flow of fluid through the valve in a manner determined by the position of said valve plug; other fluid passages through said valve plug arranged to provide hydraulic connection between each of said ports and its cooperating pressure cavity in certain positions of said valve plug so as to equalize port pressure at opposite sides of said plug; and still other means whereby said hydraulic connection between each of said ports and its cooperating pressure cavity will be maintained during rotation of said valve plug from one position to another.

7. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operative positions, said valve plug being provided with fluid control passages therethrough arranged and adapted to cooperate with said ports to restrict and control the flow of fluid through the valve in a manner determined by the position of said valve plug; other fluid passages through said valve plug arranged to provide hydraulic connection between each of said ports and its cooperating pressure cavity in certain positions of said valve plug so as to equalize port pressure at opposite sides of said plug, said fluid control passages and said other fluid passages being separated by partitions the width of which is less than the diameter of said ports and their cooperating pressure cavities so as to maintain hydraulic connection between each of said ports and its pressure cavity during the rotation of said valve plug from one position to another.

8. In a valve; a valve body provided with spaced apart confronting fluid control and restricting surfaces having inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces and having suitable operating tolerances therebetween so as to operably cooperate therewith, said valve plug having neutral and operative positions and provided with fluid control passages therethrough arranged to cooperate with said ports to restrict and control the flow of fluid through the valve in a manner determined by the position of said valve plug; other fluid passages extending through said valve plug and arranged to provide hydraulic connection between each of said ports and its pressure cavity in certain positions of said valve plug so as to equalize port pressure at opposite sides of said valve plug, said fluid control passages and said other fluid passages being separated by partitions the width of each of which is less than the diameter of said ports and their pressure cavities so as to maintain hydraulic connection between each of said ports and its pressure cavity during the rotation of said valve plug from one of its positions to another; and means between said body and said valve plug at opposite sides thereof to positively maintain said valve plug in a position to provide substantially equal operating tolerance between the opposite sides of said valve plug and the adjacent control and restricting surfaces of the body.

9. In a valve; a valve body provided with spaced apart confronting fluid control and restricting surfaces having inlet and exhaust ports for the passage of fluid formed therethrough; a pressure cavity formed in said fluid control and restricting surfaces opposite each of certain of said ports and substantially in alignment therewith, each of said ports and its cooperating pressure cavity being substantially of equal area; a valve plug movably mounted in said body with suitable operating tolerances between said fluid control and restricting surfaces so as to cooperate therewith, and having neutral and operative positions, said valve plug being provided with fluid passages therethrough arranged and adapted to cooperate with said ports in a manner determined by the position of said valve plug; means adapted to provide hydraulic connection between each of said ports and its cooperating pressure cavity in neutral position of said valve plug; other means whereby hydraulic connection between each of said ports and its cooperating pressure cavity will be maintained during movement of said valve plug from one of its positions to another; a thrust bearing at each of the opposite sides of said valve plug and engaging the same; and a micrometer adjuster applied to each of said bearings whereby said valve plug may be adjusted to and positively maintained in a position providing substantially equal operating tolerances between the opposite sides of said valve plug and the adjacent control and restricting surfaces of said body.

10. In a valve; a valve body provided with spaced apart confronting fluid control and restricting surfaces having fluid inlet and exhaust ports formed therethrough; a pressure cavity formed in the fluid control and restricting surface opposite each of certain of said ports and substantially in alignment therewith, each of said ports and its opposite pressure cavity being substantially of equal area; a valve plug rotatably mounted in said body between said fluid control and restricting surfaces so as to cooperate therewith and having neutral and operative positions, said plug being provided with certain fluid passages therethrough arranged and adapted to cooperate with certain of said ports to permit the flow of fluid through the valve only in an operative position of said plug, said valve plug being also provided with still other fluid passages therethrough arranged and adapted to cooperate with still other of said ports to permit the flow of fluid through the valve only in neutral position of said plug; and means adapted to provide hydraulic connection between each of said ports and its cooperating pressure cavity in any position of said valve plug so as to equalize port pressure at opposite sides of said plug.

11. In a valve; a valve body provided with spaced apart confronting fluid control and restricting surfaces having fluid inlet and exhaust ports formed therethrough; a valve plug movably mounted in said body between said fluid control and restricting surfaces so as to cooperate therewith and having neutral and operative positions, said plug being provided with certain fluid passages therethrough arranged and adapted to cooperate with certain of said ports to permit the flow of fluid through the valve only in an operative position of said plug, said valve plug being also provided with still other fluid passages therethrough arranged and adapted to cooperate with still other of said ports to permit the flow of fluid through the valve only in neutral position of said plug, and means adapted to positively maintain said valve plug in a position providing substantially equal operating tolerances between the opposite sides of said valve plug and the adjacent control and restricting surfaces of the body.

CHARLES LE BLEU.